(12) United States Patent
Ertas et al.

(10) Patent No.: US 10,066,505 B2
(45) Date of Patent: Sep. 4, 2018

(54) FLUID-FILLED DAMPER FOR GAS BEARING ASSEMBLY

(71) Applicant: General Electric Company, Schenectady, NY (US)

(72) Inventors: Bugra Han Ertas, Niskayuna, NY (US); Joshua Tyler Mook, Loveland, OH (US); Jason Joseph Bellardi, Cincinnati, OH (US)

(73) Assignee: GENERAL ELECTRIC COMPANY, Shenectady, NY (US)

( * ) Notice: Subject to any disclaimer, the term of this patent is extended or adjusted under 35 U.S.C. 154(b) by 0 days.

(21) Appl. No.: 15/131,097

(22) Filed: Apr. 18, 2016

(65) Prior Publication Data
US 2017/0298765 A1    Oct. 19, 2017

(51) Int. Cl.
*F16C 17/02* (2006.01)
*F16C 27/02* (2006.01)
(Continued)

(52) U.S. Cl.
CPC .......... *F01D 25/164* (2013.01); *F16C 17/035* (2013.01); *F16C 25/04* (2013.01);
(Continued)

(58) Field of Classification Search
CPC ........ F16C 17/035; F16C 19/10; F16C 27/02; F16C 27/063; F16C 32/0602;
(Continued)

(56) References Cited

U.S. PATENT DOCUMENTS 2,972,504 A    2/1961  Baker
3,004,804 A   10/1961  Pinkus et al.
(Continued)

FOREIGN PATENT DOCUMENTS

CH              550340 A      6/1974
DE     102012214738 A1 *  2/2014  ............. G01R 31/12
(Continued)

OTHER PUBLICATIONS

European Search Report and Opinion Issued in connection with related EP Application No. 17165709.1 dated May 31, 2017.
(Continued)

*Primary Examiner* — Marcus Charles
(74) *Attorney, Agent, or Firm* — GE Global Patent Operation; Nitin Joshi (57) ABSTRACT

The present disclosure is directed to a gas-lubricated bearing assembly for a gas turbine engine and method of damping same. The bearing assembly includes a bearing pad for supporting a rotary component and a bearing housing attached to or formed integrally with the bearing pad. The bearing housing includes a first fluid damper cavity, a second fluid damper cavity in restrictive flow communication with the first fluid damper cavity via a restrictive channel configured as a clearance gap, and a damper fluid configured within the first and second fluid damper cavities. More specifically, the damper fluid of the present disclosure is configured to withstand the high temperature environment of the engine. Thus, the bearing housing is configured to transfer the damper fluid from the first fluid damper cavity to the second fluid damper cavity via the restrictive channel in response to a force acting on the bearing pad.

19 Claims, 10 Drawing Sheets (51) Int. Cl.
*F01D 25/16* (2006.01)
*F16C 32/06* (2006.01)
*F16F 9/10* (2006.01)
*F16F 15/023* (2006.01)
*F16C 17/03* (2006.01)
*F16C 25/04* (2006.01)

(52) U.S. Cl.
CPC .......... *F16C 27/02* (2013.01); *F16C 32/0603* (2013.01); *F16C 32/0622* (2013.01); *F16F 9/10* (2013.01); *F16F 15/0237* (2013.01); *F05D 2220/32* (2013.01); *F05D 2240/53* (2013.01); *F16C 2360/23* (2013.01); *F16F 2222/12* (2013.01); *F16F 2224/04* (2013.01); *F16F 2228/008* (2013.01)

(58) Field of Classification Search
CPC .............. F16C 2360/23; F26C 32/0666; F01D 25/164; F16F 15/0235; F16F 15/162; F16F 2222/12; F16F 2228/008; F16F 2224/04; F05D 2220/32; F05D 2240/53
USPC .......... 384/99, 100, 103, 114, 117–119, 129, 384/312, 397, 420; 267/113, 118
See application file for complete search history.

(56) References Cited

U.S. PATENT DOCUMENTS

| | | |
|---|---|---|
| 3,110,526 A | 11/1963 | Sternlicht |
| 3,351,394 A | 11/1967 | Hooker |
| 3,620,581 A | 11/1971 | Heller et al. |
| 3,721,479 A | 3/1973 | Rasnick et al. |
| 3,863,996 A | 2/1975 | Raimondi |
| 3,891,281 A | 6/1975 | Jenness |
| 3,898,793 A | 8/1975 | Nakamura et al. |
| 3,944,304 A | 3/1976 | Purtschert |
| 3,994,541 A | 11/1976 | Geary et al. |
| 4,226,483 A | 10/1980 | Yamamoto |
| 4,262,975 A | 4/1981 | Heshmat et al. |
| 4,410,220 A | 10/1983 | Robinson |
| 4,511,126 A * | 4/1985 | Bernuchon ............ F16F 13/106 267/140.13 |
| 4,632,574 A | 12/1986 | Wilson et al. |
| 4,743,125 A | 5/1988 | Dammel et al. |
| 4,793,722 A | 12/1988 | Jensen |
| 4,872,767 A | 10/1989 | Knapp |
| 4,921,229 A | 5/1990 | Hori |
| 4,971,458 A | 11/1990 | Carlson |
| 5,044,781 A | 9/1991 | Werner |
| 5,085,521 A | 2/1992 | Singh |
| 5,149,206 A | 9/1992 | Bobo |
| 5,222,815 A | 6/1993 | Ide |
| 5,328,408 A | 7/1994 | Wolf et al. |
| 5,360,273 A | 11/1994 | Buckmann |
| 5,374,129 A | 12/1994 | Vohr et al. |
| 5,380,100 A | 1/1995 | Yu |
| 5,421,655 A | 6/1995 | Ide |
| 5,452,957 A * | 9/1995 | Duggan ................ B60K 17/24 384/535 |
| 5,501,531 A | 3/1996 | Hamaekers |
| 5,603,574 A | 2/1997 | Ide |
| 5,743,654 A | 4/1998 | Ide |
| 6,019,515 A | 2/2000 | Fujii et al. |
| 6,169,332 B1 | 1/2001 | Taylor et al. |
| 6,308,810 B1 | 10/2001 | Kuwayama |
| 6,536,565 B2 | 3/2003 | Oliver et al. |
| 6,679,045 B2 | 1/2004 | Karafillis et al. |
| 6,700,747 B2 | 3/2004 | Matz |
| 6,883,967 B2 * | 4/2005 | Robb .................... F16C 35/077 267/140.12 |
| 7,290,931 B2 | 11/2007 | Wardman et al. |
| 7,394,076 B2 | 7/2008 | Devitt |
| 7,431,504 B1 * | 10/2008 | Pelfrey ................. F01D 25/164 384/535 |
| 7,517,152 B1 | 4/2009 | Walsh |
| 7,607,647 B2 | 10/2009 | Zhao et al. |
| 7,625,121 B2 | 12/2009 | Pettinato et al. |
| 7,628,542 B2 | 12/2009 | Wada et al. |
| 7,896,550 B1 | 3/2011 | Pinera et al. |
| 7,987,599 B2 | 8/2011 | Mavrosakis |
| 8,083,413 B2 | 12/2011 | Ertas |
| 8,118,570 B2 | 2/2012 | Meacham et al. |
| 8,146,369 B2 | 4/2012 | Walitzki et al. |
| 8,206,039 B2 | 6/2012 | Maier |
| 8,209,834 B2 | 7/2012 | Mons et al. |
| 8,240,919 B2 | 8/2012 | Hirata |
| 8,256,750 B2 | 9/2012 | Cottrell et al. |
| 8,272,786 B2 | 9/2012 | Cottrell |
| 8,342,796 B2 | 1/2013 | Spencer et al. |
| 8,591,117 B2 | 11/2013 | Giraud et al. |
| 8,702,311 B2 | 4/2014 | Matsuo et al. |
| 8,720,205 B2 | 5/2014 | Lugg |
| 8,796,893 B2 | 8/2014 | Muth |
| 8,814,437 B2 | 8/2014 | Braun |
| 8,834,027 B2 | 9/2014 | Zeidan |
| 8,998,492 B2 | 4/2015 | Bertea |
| 9,046,001 B2 | 6/2015 | Hindle et al. |
| 9,121,448 B2 | 9/2015 | Delgado Marquez et al. |
| 9,169,846 B2 | 10/2015 | Mariotti |
| 9,297,438 B2 | 3/2016 | Meacham et al. |
| 2005/0008269 A1 | 1/2005 | Akutsu et al. |
| 2006/0054660 A1 | 3/2006 | Chappell |
| 2006/0186589 A1* | 8/2006 | Cheng .................... F16F 15/02 267/292 |
| 2010/0207007 A1* | 8/2010 | Cottrell .................. B64D 27/26 248/638 |
| 2012/0025521 A1 | 2/2012 | Baller et al. |
| 2013/0216174 A1 | 8/2013 | Braun |
| 2014/0140645 A1 | 5/2014 | Meacham et al. |
| 2014/0154058 A1 | 6/2014 | Meacham et al. |
| 2014/0286599 A1 | 9/2014 | Devitt et al. |
| 2015/0104123 A1 | 4/2015 | Ertas et al. |
| 2015/0275967 A1 | 10/2015 | Ryu |
| 2017/0298752 A1 | 10/2017 | Mook et al. |
| 2017/0298766 A1 | 10/2017 | Ertas et al. |
| 2017/0298772 A1 | 10/2017 | Mook et al. |
| 2017/0298830 A1 | 10/2017 | Ertas et al. |

FOREIGN PATENT DOCUMENTS

| | | | |
|---|---|---|---|
| EP | 0642130 A2 | 3/1995 | |
| EP | 2853759 A1 | 4/2015 | |
| JP | 2001050267 A | 2/2001 | |
| JP | 2009030704 A | 2/2009 | |
| JP | 2012092969 A | 5/2012 | |
| WO | WO-2015053870 A1 * | 4/2015 | ........... F01D 25/164 |

OTHER PUBLICATIONS

U.S. Non-Final Office Action Issued in connection with related U.S. Appl. No. 15/131,081 dated Jun. 13, 2017.

Dellacorte et al., "Load Capacity Estimation of Foil Air Journal Bearings for Oil-Free Turbomachinery Applications", Tribology Transactions, Taylor & Francis Online, vol. No. 43, Issue No. 4, pp. 795-801, 2000.

Andres, "Hybrid Flexure Pivot-Tilting Pad Gas Bearings: Analysis and Experimental Validation", Journal of Tribology, ASME, vol. No. 128, Issue No. 3, 551-558, Mar. 1, 2006.

Gu et al., "Laser additive manufacturing of metallic components: materials, processes and mechanisms", International Materials Reviews, Maney Online, vol. No. 57, Issue No. 3, pp. 133-164, May 2012.

U.S. Notice of Allowance issued in connection with related U.S. Appl. No. 14/566,798 dated Apr. 26, 2016.

U.S. Non-Final Rejection issued in connection with related U.S. Appl. No. 15/131,136 dated May 8, 2017.

Gunter et al., "Design of Nonlinear Squeeze-Film Dampers for Aircraft Engines", Journal of Lubrication Technology, vol. No. 99, Issue No. 01, pp. 57-64, Mar. 10, 1976.

(56) References Cited

OTHER PUBLICATIONS

Heshmat et al., "Analysis of Gas-Lubricated Foil Journal Bearings", Journal of Lubrication Technology, vol. No. 105, Issue No. 4, pp. 647-655, Oct. 1, 1983.
Agrawal, "Foil Air/Gas Bearing Technology—An Overview", Microturbines and Small Turbomachinery, ASME International Gas Turbine and Aeroengine Congress and Exhibition, Orlando, Florida, USA, Paper No. 97-GT-347, 11 pages, Jun. 2-5, 1997.
U.S. Non-Final Office Action issued in connection with related U.S. Appl. No. 15/131,113 dated Nov. 17, 2016.

* cited by examiner

FLUID-FILLED DAMPER FOR GAS BEARING ASSEMBLY

FIELD OF THE INVENTION

The present subject matter relates generally to a bearing assembly, and more particularly to a fluid-filled damper for a gas bearing assembly that may be used in a gas turbine engine and methods of filling same.

BACKGROUND OF THE INVENTION

A gas turbine engine generally includes a fan and a core arranged in flow communication with one another. Additionally, the core of the gas turbine engine general includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

Conventional gas turbine engines include rotor assemblies having shafts, compressor impellers, turbines, couplings, sealing packs, and other elements required for optimal operation under given operating conditions. These rotor assemblies have a mass generating a constant static force due to gravity, and also generate a dynamic force due to, e.g., imbalances in the rotor assembly during operation. Such gas turbine engines include bearing assemblies to sustain and support these forces while permitting rotation of the rotor assembly. A typical bearing assembly includes a bearing housed within a bearing housing and a bearing pad configured between the bearing and the shafts.

Conventional aircraft engines operate using rolling element bearings. Such oil-requiring bearings support static and dynamics loads from the rotating system throughout the operating cycle of the engine. Though rolling elements are a proven technology that have been used since the conception of the jet engine, the necessity for oil requires several support hardware and ancillary devices. Thus, removal of rolling element bearings from the engine system could potentially provide significant weight savings in addition to improved reliability.

Accordingly, at least some known rotary machines use gas bearings where non-oil lubricated bearings are desired. For successful operation, gas bearings must address typical mission cycle loads. As such, at least two hurdles must be considered for gas bearings used in high performance turbomachinery, such as aircraft engines, including 1) load capacity and 2) damping.

In view of the aforementioned, a hermetically sealed damper and damper fluid for a gas bearing and method of filling of same that allows for successful operations at high temperatures would be welcomed in the art.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a bearing assembly for a gas turbine engine. The bearing assembly includes a bearing pad for supporting a rotary component and a bearing housing attached to or formed integrally with the bearing pad. The bearing housing includes a first fluid damper cavity positioned adjacent to the bearing pad, a second fluid damper cavity spaced from the first fluid damper cavity and in restrictive flow communication with the first fluid damper cavity via a restrictive channel configured as a clearance gap, and a damper fluid configured within the first and second fluid damper cavities. Thus, the bearing housing is configured to transfer the damper fluid from the first fluid damper cavity to the second fluid damper cavity via the restrictive channel in response to a force acting on the bearing pad.

In another aspect, the present disclosure is directed to a method for providing damping to a gas-lubricated bearing assembly of a gas turbine engine. The bearing assembly has a bearing pad for supporting a rotary component and a bearing housing attached to or formed integrally with the bearing pad. Thus, the method includes filling a first fluid damper cavity of the bearing housing positioned adjacent to the bearing pad with a damper fluid. Another step includes filling a second fluid damper cavity of the bearing housing spaced from the first fluid damper cavity with the damper fluid, the second fluid damper cavity in restrictive flow communication with the first fluid damper cavity via a restrictive channel. Further, the method includes allowing the damper fluid to flow between the first and second fluid damper cavities via the restrictive channel in response to a force acting on the bearing pad, the flow of damper fluid providing damping to the gas-lubricated bearing assembly.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Generally, the present disclosure is directed to a gas-lubricated bearing assembly for a gas turbine engine and method of filling same. The bearing assembly includes a bearing pad for supporting a rotary component and a bearing housing attached to or formed integrally with the bearing pad. The bearing housing includes a first fluid damper cavity, a second fluid damper cavity in restrictive flow communication with the first fluid damper cavity via a restrictive channel configured as a clearance gap, and a damper fluid configured within the first and second fluid damper cavities. More specifically, the damper fluid of the present disclosure is configured to withstand the high temperature environment of the engine. Thus, the bearing housing is configured to transfer the damper fluid from the first fluid damper cavity to the second fluid damper cavity via the restrictive channel in response to a force acting on the bearing pad.

Accordingly, the present disclosure provides many advantages not present in the prior art. For example, the main challenge with damping within gas bearings of aircraft engines is the operating temperature in the turbine regions, which can reach 900 degrees Fahrenheit (° F.), where conventional petroleum/silicon based fluids cannot operate. As such, the present disclosure provides a fluid-filled damper for gas bearings that contain fluid that can withstand such temperatures. For example, one type of fluid which can withstand the temperatures in the turbine sections is liquid metal (e.g. gallium indium alloys), which can operate above 1500° F. and have a relatively low solidification temperature. Such liquid metals may also have a modest change in fluid viscosity with temperature. For example, unlike petroleum/silicon based fluids, gallium indium alloys possess moderate drops viscosity, whereas such other fluids can decrease by orders of magnitude over several hundred degrees Fahrenheit. The modest drop in viscosity for indium alloys provides a relatively constant damping performance through the temperature ranges that the engine experiences during operation, and therefore allows optimization of damping over wider operating ranges.

In addition, another advantage to the damping fluid of the present disclosure is the coefficient of thermal expansion (CTE). More specifically, the damping fluid CTE is close to that of metal and therefore the differential CTE between the bearing housing and the damper fluid is marginal, which allows the differential expansion between the bearing housing and the damper fluid to be easily managed, e.g. by providing an accumulation component or flexible/expandable section to absorb any mismatch in CTE. Other fluids, such as oils or silicon, have a much larger CTE compared to metal; therefore, the expansion over several hundred degrees Fahrenheit becomes increasingly difficult.

Figure 1:
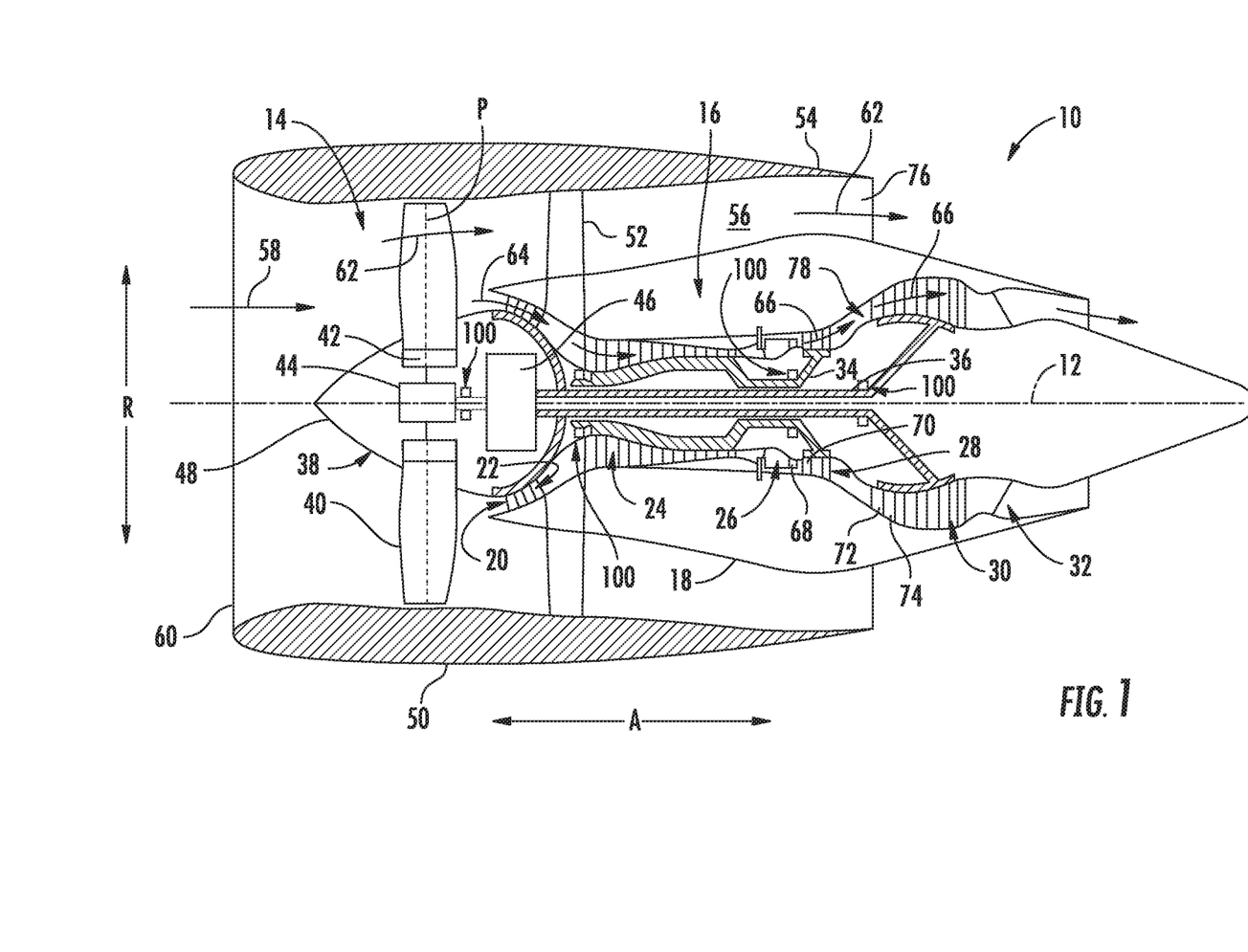
FIG. 1 illustrates a schematic cross-sectional view of one embodiment of a gas turbine engine according to the present disclosure.

Referring now to the drawings, wherein identical numerals indicate the same elements throughout the figures, FIG. 1 illustrates one embodiment of a schematic cross-sectional view of a turbomachine according to the present disclosure. More particularly, for the embodiment of FIG. 1, the turbomachine is configured as a gas turbine engine 10, or rather as a high-bypass turbofan jet engine. As shown in FIG. 1, the gas turbine engine 10 defines an axial direction A1 (extending parallel to a longitudinal centerline 12 provided for reference), a radial direction R1, and a circumferential direction (not shown) extending about the axial direction A1. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases and the core turbine engine 16 includes, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. Accordingly, the LP shaft 36 and HP shaft 34 are each rotary components, rotating about the axial direction A1 during operation of the gas turbine engine 10.

In order to support such rotary components, the gas turbine engine includes a plurality of air bearing assemblies 100 attached to various structural components within the gas turbine engine 10. More specifically, in the illustrated embodiment, the bearing assemblies 100 facilitate rotation of the LP shaft 36 and the HP shaft 34 and dampen vibrational energy imparted to bearing assemblies 100 during operation of the gas turbine engine 10. Although the bearing assemblies 100 are described and illustrated as being located generally at forward and aft ends of the respective LP shaft 36 and HP shaft 34, the bearing assemblies 100 may additionally, or alternatively, be located at any desired location along the LP shaft 36 and HP shaft 34 including, but not limited to, central or mid-span regions of the shafts 34, 36, or other locations along shafts 34, 36 where the use of conventional bearing assemblies 100 would present significant design challenges. Further, the bearing assemblies 100 may be used in combination with conventional oil-lubricated bearing assemblies. For example, in one embodiment, conventional oil-lubricated bearing assemblies may be located at the ends of shafts 34, 36, and one or more bearing assemblies 100 may be located along central or mid-span regions of shafts 34, 36.

Referring still to the embodiment of FIG. 1, the fan section 14 includes a variable pitch fan 38 having a plurality of fan blades 40 coupled to a disk 42 in a spaced apart manner. As depicted, the fan blades 40 extend outwardly from disk 42 generally along the radial direction R1. Each fan blade 40 is rotatable relative to the disk 42 about a pitch axis P by virtue of the fan blades 40 being operatively coupled to a suitable pitch change mechanism 44 configured to collectively vary the pitch of the fan blades 40 in unison. The fan blades 40, disk 42, and pitch change mechanism 44 are together rotatable about the longitudinal axis 10 by LP shaft 36 across a power gearbox 46. The power gear box 46 includes a plurality of gears for adjusting the rotational speed of the fan 38 relative to the LP shaft 36 to a more efficient rotational fan speed. More particularly, the fan section includes a fan shaft rotatable by the LP shaft 36 across the power gearbox 46. Accordingly, the fan shaft may also be considered a rotary component, and is similarly supported by one or more bearings.

Referring still to the exemplary embodiment of FIG. 1, the disk 42 is covered by a rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. The exemplary nacelle 50 is supported relative to the core turbine engine 16 by a plurality of circumferentially-spaced outlet guide vanes 52. Moreover, a downstream section 54 of the nacelle 50 extends over an outer portion of the core turbine engine 16 so as to define a bypass airflow passage 56 therebetween.

During operation of the gas turbine engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the core air flowpath 37, or more specifically into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the gas turbine engine 10 depicted in FIG. 1 is provided by way of example only, and that in other exemplary embodiments, the gas turbine engine 10 may have any other suitable configuration. It should also be appreciated, that in still other exemplary embodiments, aspects of the present disclosure may be incorporated into any other suitable gas turbine engine. For example, in other exemplary embodiments, aspects of the present disclosure may be incorporated into, e.g., a turboprop engine, a turboshaft engine, or a turbojet engine. Further, in still other embodiments, aspects of the present disclosure may be incorporated into any other suitable turbomachine, including, without limitation, a steam turbine, a centrifugal compressor, and/or a turbocharger.

Figure 2:
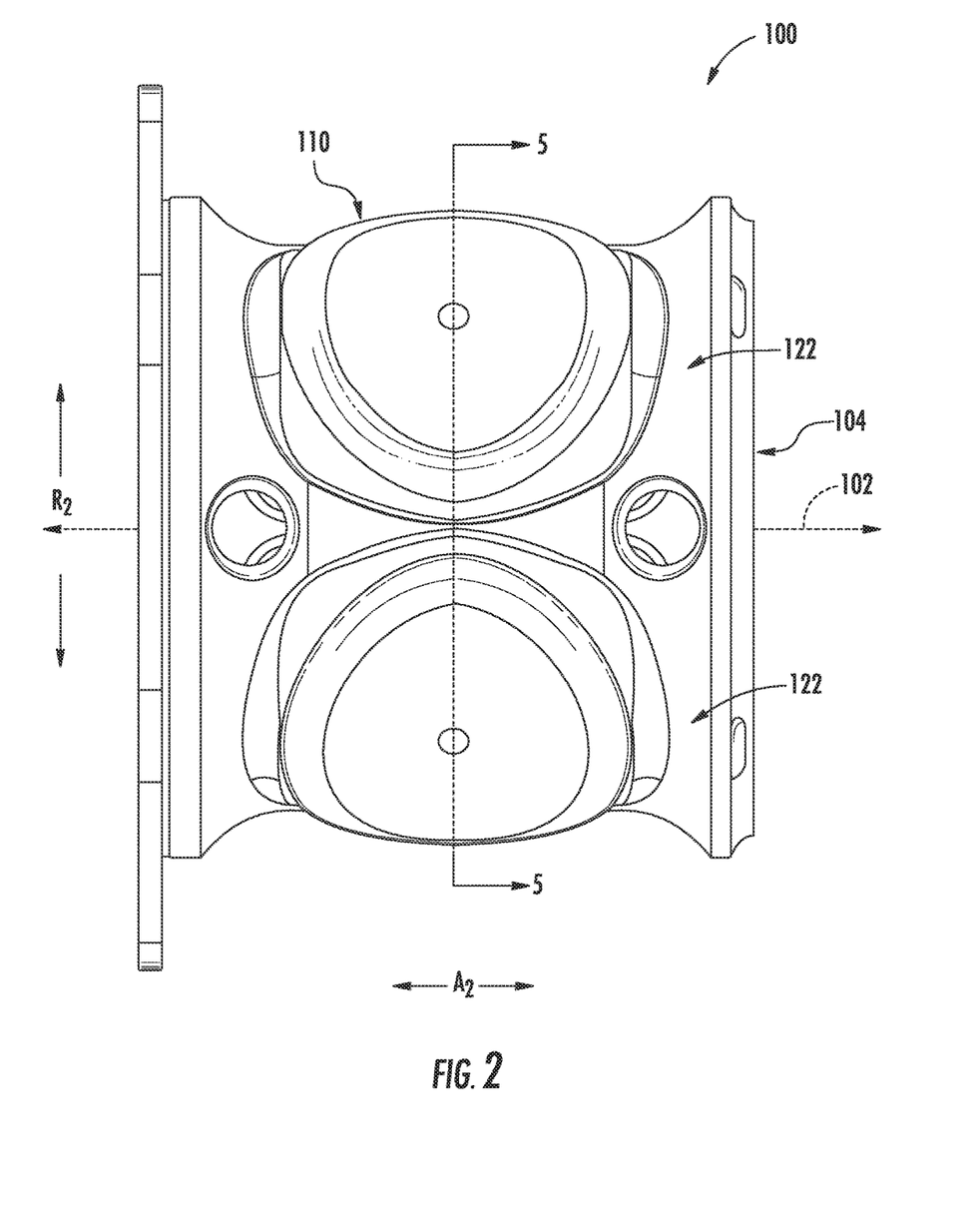
FIG. 2 illustrates a side view of one embodiment of a bearing assembly according to the present disclosure.
Figure 3:
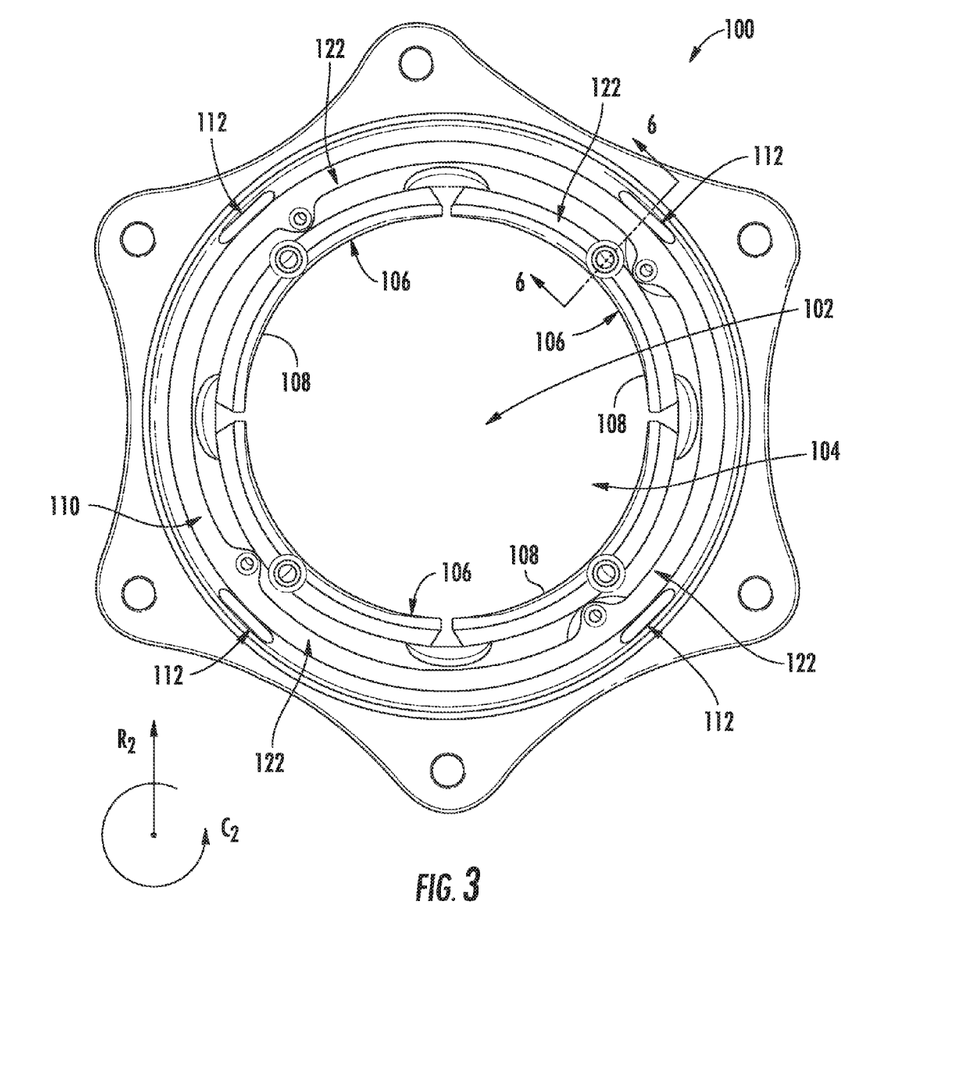
FIG. 3 illustrates an end view of the bearing assembly of FIG. 2.
Figure 4:
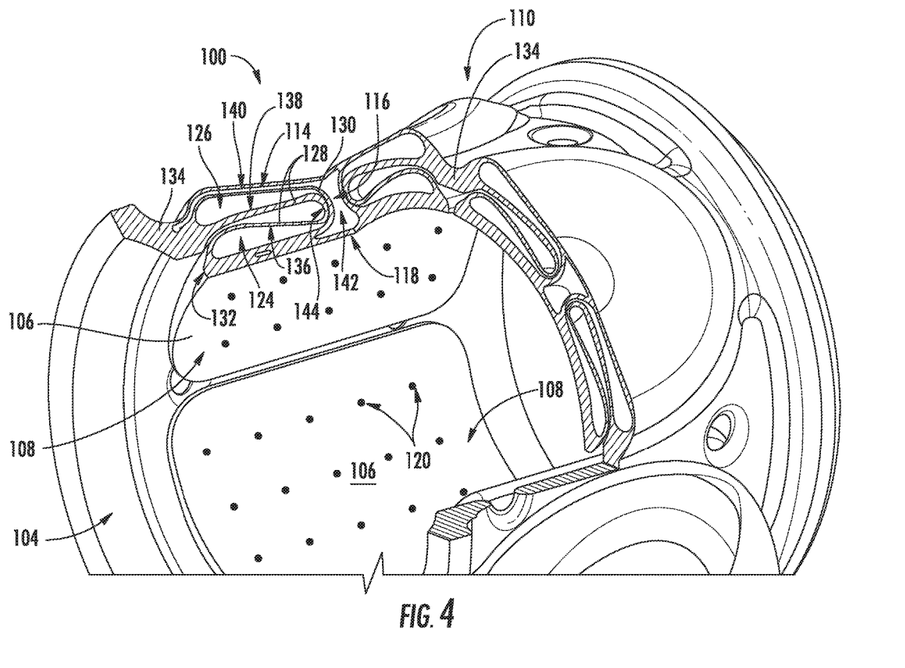
FIG. 4 illustrates a perspective, cutaway view of the bearing assembly of FIG. 2.

Referring now to FIGS. 2 through 4, a bearing assembly 100 in accordance with an exemplary embodiment of the present disclosure is illustrated. More specifically, FIG. 2 illustrates a side view of one embodiment of a bearing assembly 100 according to the present disclosure; FIG. 3 illustrates an end view of the bearing assembly 100 of FIG. 2; and FIG. 4 illustrates a perspective, cut-away view of the bearing assembly 100 of FIG. 2. In certain embodiments, the bearing assembly 100 may be incorporated into the gas turbine engine 10 described above with reference to FIG. 1, or alternatively, the bearing assembly 100 may be incorporated into any other suitable gas turbine engine or turbomachine.

As shown, the bearing assembly 100 generally defines an axial direction A2 (and a central axis 102 extending generally along the axial direction A2), a radial direction R2, and a circumferential direction C2. Further, the bearing assembly 100 defines an axial opening 104 and is configured to support a rotary component, e.g., of the gas turbine engine 10, within the axial opening 104. Further, the bearing assembly 100 generally includes one or more bearing pads 106, each defining inner and outer surfaces for supporting the rotary component and a housing 110 attached to or formed integrally with the bearing pad(s) 106. In addition, the bearing assembly 100 is configured as an "air" bearing, or oil-free/oil-less bearing, and accordingly the housing 110 is generally configured to provide the inner surfaces 108 of the one or more bearing pads 106 with a flow of a working gas (e.g., air, compressed air and combustion gases, or the like) during operation to create separation with the rotary component and provide a low friction means for supporting such rotary component (not depicted).

As such, the bearing housing 110 includes a gas inlet 112 (FIG. 3) at a first end along the axial direction A2 and a supply channel 114 (FIG. 4) extending from the gas inlet 112 to a column 116. The column 116 is configured to provide the bearing pad 106 with a flow of the working gas from the supply channel 114, as will be discussed in greater detail below. Additionally, as shown, the column 116 extends towards the bearing pad 106 and supports the bearing pad 106. More specifically, as shown in the illustrated embodiment, the column 116 fully supports the bearing pad 106.

Further, as shown, the column 116 is located approximately at a center of the bearing pad 106. More particularly, the bearing pad 106 defines a center 118, and the column 116 is at least partially attached to or formed integrally with the bearing pad 106 proximate the center 118 of the bearing pad 106. However, in other embodiments, the column 116 may instead be positioned off-center from the bearing pad 106.

In certain embodiments, the bearing pad 106 may be configured to disperse and/or diffuse the working gas to support and/or lubricate the rotary component during operation of the bearing assembly. In such manner, the bearing assembly 100 may provide a hydrostatically pressurized compliant bearing pad. For example, as shown, the bearing pad 106 includes a plurality of gas distribution holes 120 disposed across the bearing pad 106 to provide an evenly distributed pressure field within the axial opening 104 for supporting and/or lubricating the rotary component.

The plurality of gas distribution holes 120 may be configured having any dimensions or arrangements (e.g., array, pattern or configuration) suitable to function as described herein. For example, in some embodiments, the plurality of gas distribution holes 120 may generally have a diameter in the range of between about 2 mils (about 50 micrometers) and about 100 mils (about 2,540 micrometers) and, more specifically, between about 5 mils (about 127 micrometers) and about 20 mils (about 508 micrometers). Alternatively, or in addition, each bearing pad 106 may have a sufficiently high gas permeability to permit the working gas received from the column 116 to generate sufficient pressure within the axial opening 104 to provide the support and/or lubrication of the rotary component.

Figure 5:
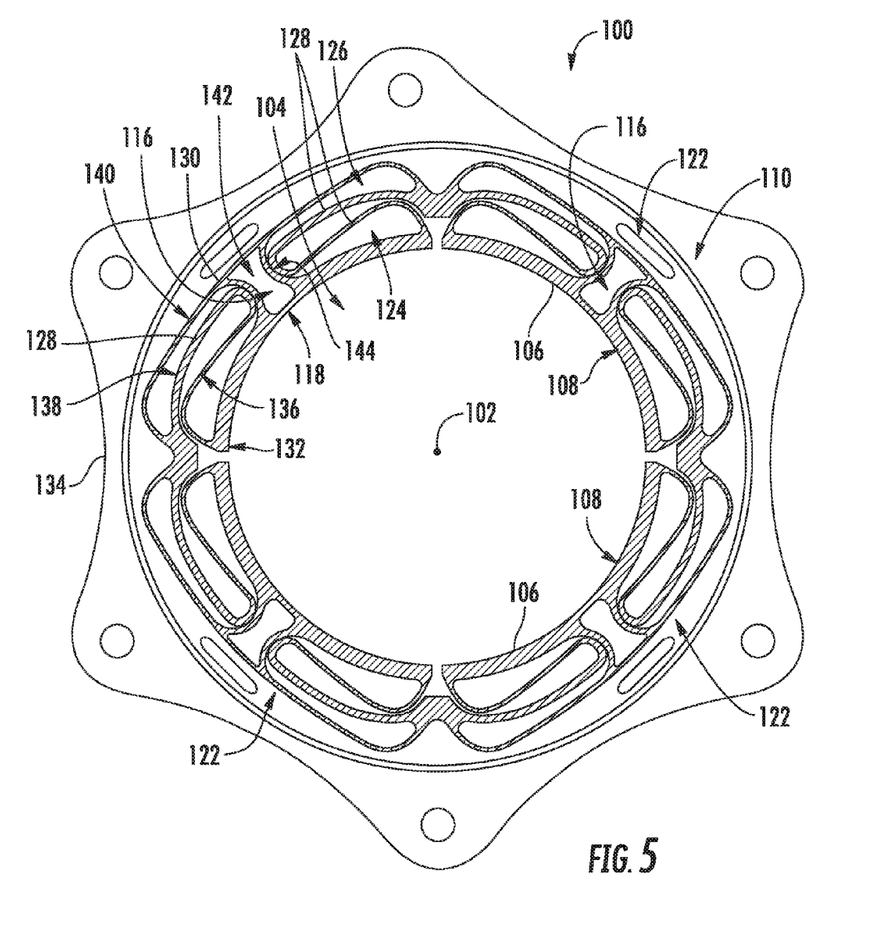
FIG. 5 illustrates a cross-sectional view of the bearing assembly of FIG. 2, taken along line 5-5.

Furthermore, as shown in FIG. 5, the bearing assembly 100 includes a plurality of sections 122 spaced along the circumferential direction C2 of the bearing assembly 100. Each section 122 may generally include a bearing pad 106 (e.g., configured in the same manner described above) and a respective portion of the housing 110 configured as a damper assembly. Accordingly, as may be seen most clearly in, e.g., FIG. 3, the bearing assembly 100 includes a plurality of bearing pads 106 substantially evenly spaced along the circumferential direction C2. Further, each of the bearing pads 106 defines a respective inner surface 108, with the inner surfaces 108 of the plurality of bearing pads 106 together defining a substantially annular support surface along the circumferential direction C2 (see, e.g., FIG. 3) and a linear support surface along the axial direction A2 (see, e.g., FIG. 6, discussed below) for supporting a rotary component.

The bearing pads 106 may be fabricated from any material suitable to withstand the working conditions of the bearing assembly 100. In addition, in some embodiments, the bearing pads 106 are fabricated from a material having a sufficiently low porosity to prevent instabilities in the thin gas film created between bearing pads 106 and the rotary component during operation of, e.g., the turbomachine. For example, in some embodiments, the bearing pads 106 may be fabricated from porous carbons, such as carbon graphite, sintered porous ceramics, and sintered porous metals, such as Inconel® and stainless steel.

Moreover, in some embodiments, the bearing pad 106 and the bearing housing 110 of each section 122 may be formed integrally of a single, continuous material. For example, in some embodiments, each of the bearing pads 106 may be formed integrally with the housing 110 of the respective section 122 of the bearing assembly 100, such that the bearing pad 106 and housing 110 of the respective section 122 are fabricated to form a single integral part. Further, in certain embodiments, a plurality of bearing pads 106 and respective portions of the housing 110 forming two or more sections 122 may be formed integrally, or further still, each of the plurality of bearing pads 106 and respective portions of the housing 110 forming the bearing assembly 100 may be formed integrally.

The bearing pads 106 and the bearing housing 110 may be fabricated via any technique suitable to facilitate forming the integral part depicted and described below. For example, in some embodiments, the bearing pads 106 and the housing 110 may be fabricated using an additive manufacturing process (also known as rapid prototyping, rapid manufacturing, and 3D printing), such as selective laser sintering (SLS), direct metal laser sintering (DMLS), electron beam melting (EBM), diffusion bonding, or selective heat sintering (SHS). It should be appreciated, however, that in other embodiments one or more of the bearing sections 122, including a bearing pad 106 and a respective portion of the housing 110, may be formed integrally of a single, continuous material and joined to separately formed, adjacent bearing sections 122 in any other suitable manner, such as through a mechanical fastening means.

Figure 6:
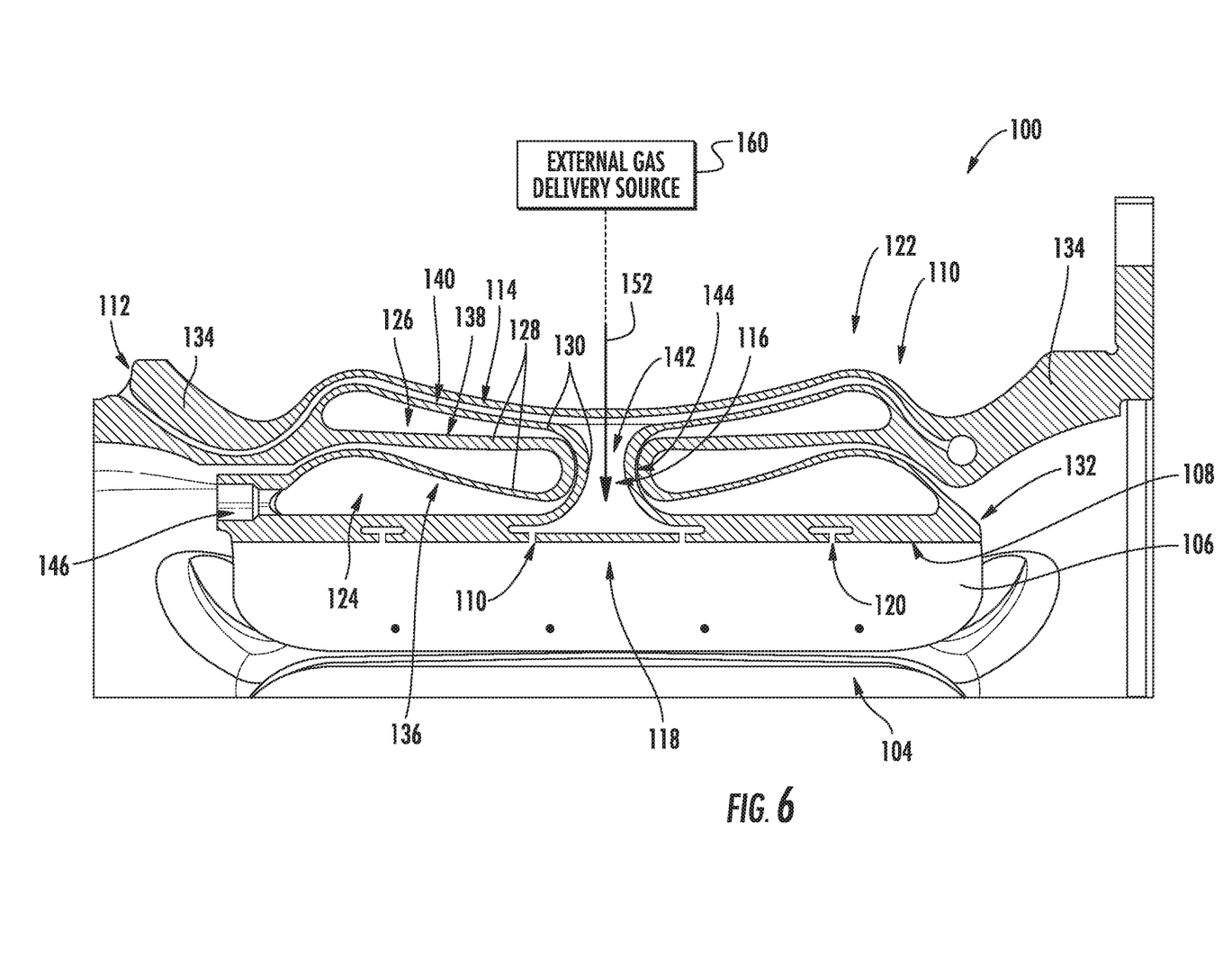
FIG. 6 illustrates a cross-sectional view of the bearing assembly of FIG. 2, taken along line 6-6.

Referring now to FIG. 4, and also to FIGS. 5 and 6 providing cross-sectional views of the bearing assembly 100 (along line 5-5 in FIG. 2 and line 6-6 in FIG. 3, respectively), as briefly noted above each of the bearing sections 122 includes a portion of the housing 110 configured as a damper assembly. More particularly, as shown, the housing 110 at least partially defines a first fluid damper cavity 124 and a second fluid damper cavity 126. For example, in certain embodiments, the first fluid damper cavity 124 and the second fluid damper cavity 126 each extend three hundred and sixty degrees (360°) around the column 116. Additionally, the first fluid damper cavity 124 is positioned adjacent to the bearing pad 106 and the second fluid damper cavity 126 is spaced from the first fluid damper cavity 124, or more particularly, is spaced from the first fluid damper cavity 124 along the radial direction R2.

Further, as shown, the portion of the bearing housing 110 configured as a damper assembly for each bearing section 122 generally includes a first, outer wall 128 and a second, inner wall 130. In addition, the inner wall 130 and outer wall 128 are configured as a serpentine inner wall 130 and a serpentine outer wall 128 (i.e., a wall extending in a variety of directions), respectively. For example, the bearing pad 106 generally defines an outer periphery 132. The serpentine outer wall 128 is attached to or formed integrally with the bearing pad 106 proximate the outer periphery 132 of the bearing pad 106 (or rather, at the outer periphery 132 of the bearing pad 106), extends generally towards the center 118 of the bearing pad 106 along the axial direction A2, and subsequently extends back away from the center 118 of the bearing pad 106 along the axial direction A2, connecting with a body 134 of the housing 110. Similarly, as shown, the inner wall 130 is attached to or formed integrally with the bearing pad 106 proximate the center 118 of the bearing pad 106 (or rather, at the center 118 of the bearing pad 106), extends generally away from the bearing pad 106 along the radial direction R2, and subsequently extends away from the center 118 of the bearing pad 106 along the axial direction A2, also connecting with the body 134 of the housing 110.

Further, the outer wall 128 generally includes a semi-rigid portion 136 and a rigid portion 138, and similarly the inner wall 130 includes a semi-rigid portion 140. As shown, the outer wall 128 at least partially defines the first fluid damper cavity 124 and at least partially defines the second fluid damper cavity 126. Additionally, the bearing pad 106 at least partially defines the first fluid damper cavity 124, and the inner wall 130 at least partially defines the second fluid damper cavity 126. More particularly, as shown, the semi-rigid portion 136 of the outer wall 128 and bearing pad 106 together define the first fluid damper cavity 124, and the rigid portion 138 of the outer wall 128 and semi-rigid portion 140 of the inner wall 130 together define the second fluid damper cavity 126.

It should be appreciated, that as used herein, the terms "semi-rigid" and "rigid" are relative terms. Accordingly, a portion of a component of the bearing assembly 100 described as semi-rigid may be configured to bend, flex, or give way prior to a portion of a component of the bearing assembly 100 described as rigid. For example, the semi-rigid portions of the various components may be created by forming such portions with a lesser thickness as compared to the rigid portions of such components. Further, a component of the bearing assembly 100 described as "semi-rigid" herein refers to a component configured to bend, flex, or give way during normal operation of the bearing assembly 100 while incurring little or no damage.

Additionally, the first fluid damper cavity 124 is in flow communication with the second fluid damper cavity 126 through a portion of the column 116. Specifically, the column 116 depicted is configured as a double-walled column 116 formed from a portion of the inner wall 130 and a portion of the outer wall 128. Accordingly, the column 116 is supported at a radially outer end by the rigid portion 138 of the outer wall 128 and the semi-rigid portion 140 of the inner wall 130. Further, at a radially inner end the portion of the column 116 formed by the inner wall 130 is attached to the bearing pad 106 (or rather formed integrally with the bearing pad 106), and the portion of the column 116 formed by the outer wall 128 is attached to the bearing pad 106 through the semi-rigid portion 136 of the outer wall 128.

Moreover, the inner wall 130 defines an inner channel 142 for providing the bearing pad 106 with the working gas, and the outer wall 128 and inner wall 130 together define an outer channel 144. As will be appreciated, the outer channel 144 is concentric with the inner channel 142 and defines a substantially annular shape around the inner channel 142. Further, for the embodiment depicted, the outer annular channel 144 is configured as a clearance gap 150 (FIG. 10), such that the first fluid damper cavity 124 and the second fluid damper cavity 126 are in restrictive flow communication through the annular channel 144.

Further, the first fluid damper cavity 124, the second fluid damper cavity 126, and the annular channel 144 are all sealed together, and together define a fixed volume. Moreover, the bearing housing 110 defines a damper cavity supply 146 (FIG. 6) for filling the first and second fluid damper cavities 124, 126 with a damper fluid 152, such that during operation, the first and second fluid damper cavities 124, 126 and annular channel 144 are each completely filled with the damper fluid 152. A cap or other removable or permanent closure means may be positioned over the damper cavity supply 146 after the cavities 124, 126 are filled. The bearing assembly 100 is configured to transfer the damper fluid 152 from the first fluid damper cavity 124, through the annular channel 144/clearance gap 150, and to the second fluid damper cavity 126 in response to a force acting on the bearing pad 106.

Figure 7:
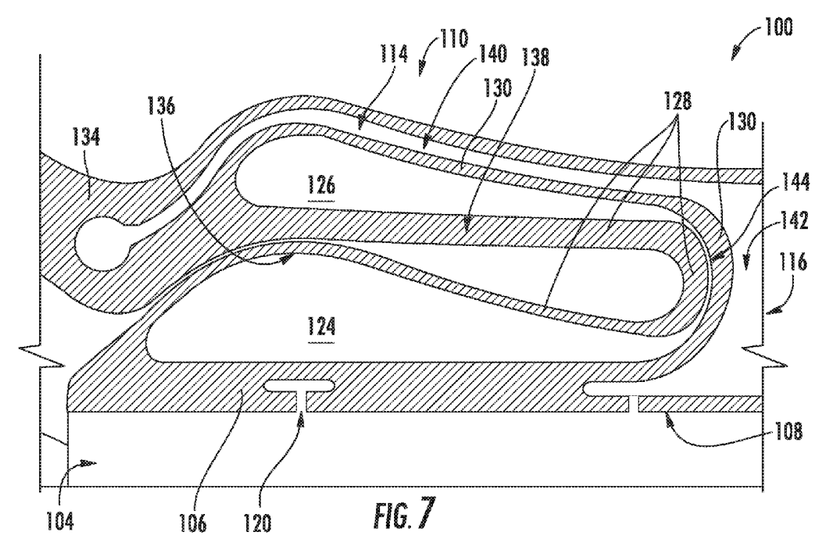
FIG. 7 illustrates a close-up, cross-sectional view of the bearing assembly of FIG. 2, particularly illustrating the bearing assembly in a depressed state.
Figure 8:
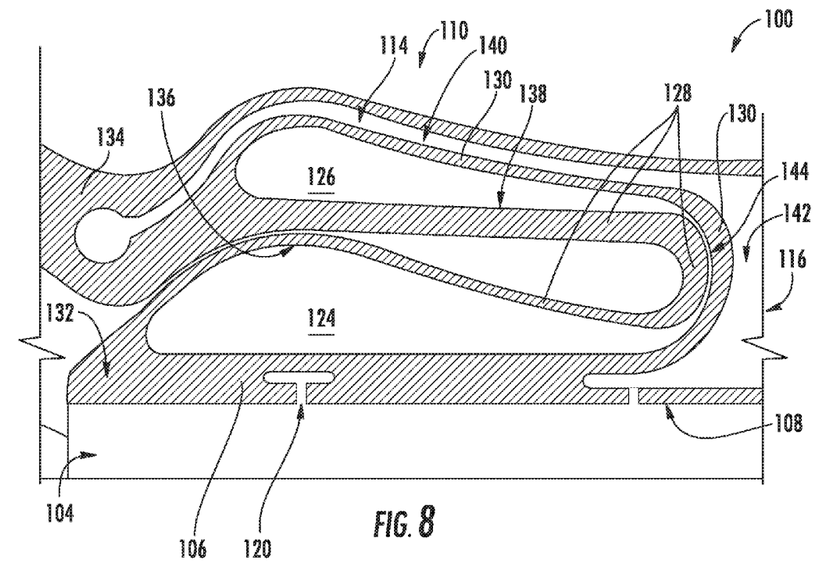
FIG. 8 illustrates a close-up, cross-sectional view of the bearing assembly of FIG. 2, particularly illustrating the bearing assembly in an extended state.

Referring now to FIGS. 7 and 8, side, cross-sectional views of a portion of the bearing assembly 100 are illustrated. More specifically, FIG. 7 illustrates a side, close-up, cross-sectional view of the bearing assembly 100 of the present disclosure having absorbed a force acting on the bearing pad 106, whereas FIG. 8 illustrates a side, close-up, cross-sectional view of the bearing assembly 100 without a force acting on the bearing pad 106.

When a force acts on the bearing pad 106, such as when a rotary component supported by the bearing assembly 100 presses on the bearing pad 106 generally along the radial direction R2, the portion of the housing 110 forming the damper assembly allows for the bearing pad 106 to move along the radial direction R2, absorbing such force. More particularly, as the column 116 supporting the bearing pad 106 moves up, the semi-rigid portion 136 of the outer wall 128 partially deforms (decreasing a volume of the first fluid damper cavity 124), a portion of the damping fluid within the first fluid damper cavity 124 is forced through the annular restrictive channel 144 of the column 116, configured as a clearance gap 150, and flows into the second fluid damper cavity 126. At the same time, the rigid portion 138 of the outer wall 128 remains substantially stationary, and the semi-rigid portion 140 of the inner wall 130 partially deforms to increase a volume of the second fluid damper cavity 126 and accept the portion of the dampening fluid provided through the annular restrictive channel 144 of the column 116 from the first fluid damper cavity 124. Such movement absorbs the force exerted on the bearing pad 106, and dampens such movement through viscous dissipation experienced within the annular restrictive channel 144 of the column 116. For example, the relatively tight clearance of the annular restrictive channel 144/clearance gap resists vibratory velocity of the bearing pad 106 along the radial direction R2. Reversal of the force exerted on the bearing pad 106, the dampening fluid transferred to the second fluid damper cavity 126 may reverse in flow direction, and flow back through the outer channel 144 of the column 116 to the first fluid damper cavity 124 (FIG. 8).

Figure 9:
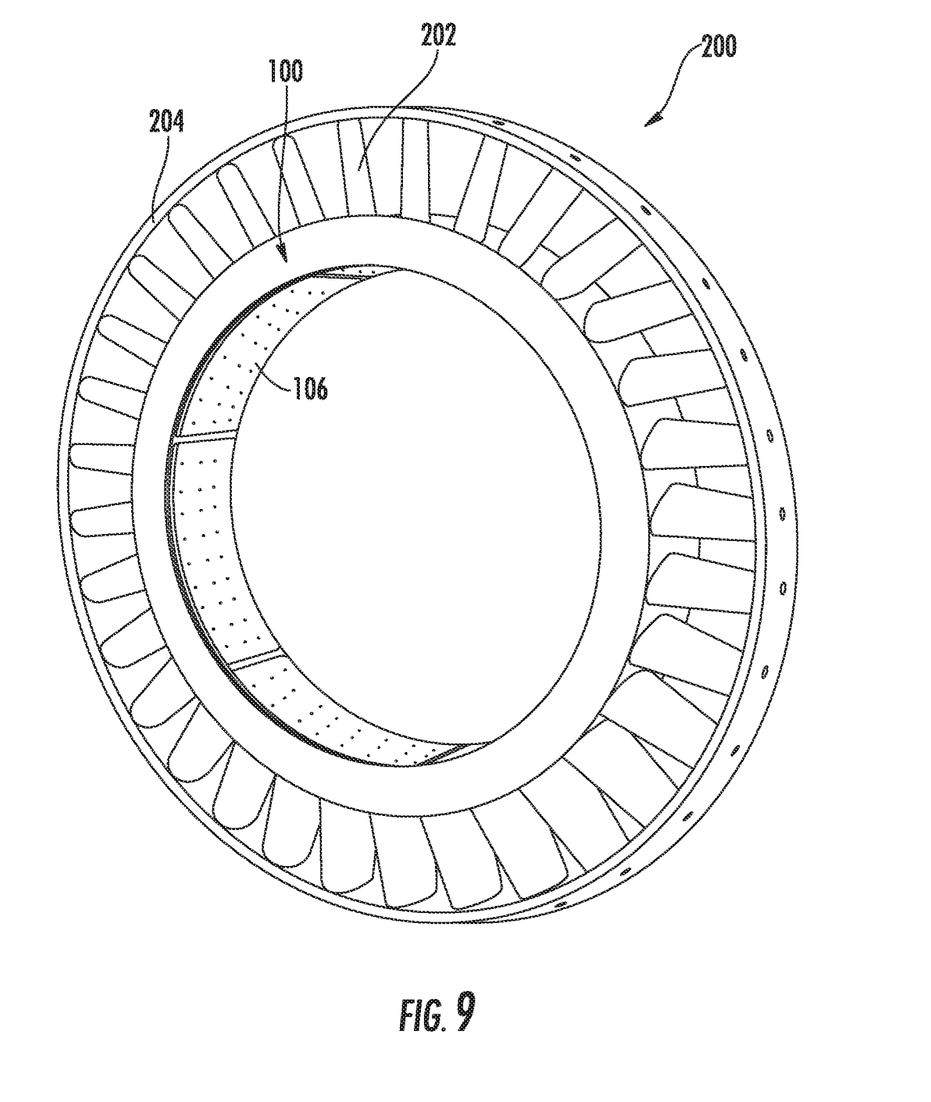
FIG. 9 illustrates a perspective view of one embodiment of a bearing assembly incorporated into a turbine nozzle according to the present disclosure.

Referring now to FIG. 9, the bearing assembly 100 described herein may be integrated into a turbine nozzle 200 of an aircraft engine. In such embodiments, guide vanes 202 of the nozzle 200 may be disposed between, and supported by, the housing 110 of the bearing assembly 100 and an outer ring 204 of the turbine nozzle 200.

Figure 10:
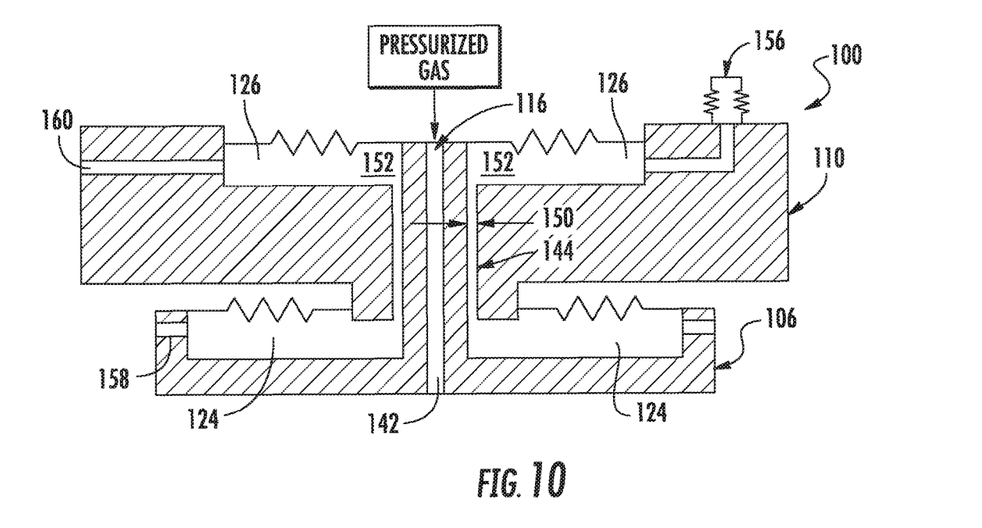
FIG. 10 illustrates a simplified, schematic diagram of one embodiment of a bearing assembly according to the present disclosure.

Referring now to FIG. 10, a simplified, schematic diagram of one embodiment of the bearing assembly 100 is illustrated. As shown, the bearing assembly 100 includes a bearing pad 106 for supporting a rotary component and a bearing housing 110 attached to or formed integrally with the bearing pad 106. Further, as mentioned, the bearing housing 110 includes a first fluid damper cavity 124 positioned adjacent to the bearing pad 106 and a second fluid damper cavity 126 spaced from the first fluid damper cavity 124. In addition, as shown, the second fluid damper cavity 126 is in restrictive flow communication with the first fluid damper cavity 124 via a channel 144 configured as a clearance gap 150. Each of the fluid damper cavities 124, 126 contain a damper fluid 152 configured therein. Further, the damper fluid 152 is configured to withstand the high temperatures of the gas turbine engine 10. Further, as mentioned, the bearing housing 110 is configured to transfer the damper fluid 152 from the first fluid damper cavity 124 to the second fluid damper cavity 126 via the channel 144 in response to a force acting on the bearing pad 110.

In further embodiments, each of the first and second fluid damper cavities 124, 126 may have a fill hole 158, 160 to allow the first and second fluid damper cavities 124, 126 to be filled, respectively, which will be discussed in more detail with regards to FIGS. 11 and 12. Further, in certain embodiments, it is important for each cavity 124, 126 to have a fill hole due to the high restriction through the channel 144.

The damper fluid 152 as described herein may include any suitable fluid that is capable of withstanding the high temperatures experienced during turbine operation. For example, in one embodiment, the damper fluid 152 may include a fluid having a viscosity that decreases with temperature by less than 10% for every 100 degrees Fahrenheit. More specifically, in certain embodiments, the damper fluid 152 may include a liquid metal. For example, in particular embodiments, the liquid metal may include a gallium-based liquid metal, which can operate above 1500° F. and have a relatively low solidification temperature. Even more particular, the gallium-based liquid metal may include a gallium indium alloy. Such liquid metals have a modest change in fluid viscosity with temperature. For example, unlike petroleum/silicon based fluids, gallium indium alloys only slightly drops viscosity, whereas such other fluids can decrease by orders of magnitude over several hundred degrees Fahrenheit. The modest drop in viscosity for indium alloys provides a relatively constant damping performance through the temperature ranges that the engine experiences during operation.

In addition, another advantage of the damper fluid 152 is the coefficient of thermal expansion (CTE). More specifically, the damping fluid CTE is close to that of metal and therefore the differential CTE between the bearing housing 110 and the damper fluid 152 is marginal, which allows the differential expansion between the bearing housing 110 and the damper fluid 152 to be easily managed, e.g. by providing an accumulation component 156 (FIG. 10) or flexible/expandable section to absorb any mismatch in CTE. Other fluids, such as oils or silicon, have a much larger CTE compared to metal; therefore, the expansion over several hundred degrees Fahrenheit becomes difficult. Thus, in certain embodiments, a coefficient of thermal expansion of the damper fluid 152 may be approximately equal to a coefficient of thermal expansion of the bearing housing 110 plus or minus about 20%, more preferably plus or minus about 10%. As such, as shown in FIG. 10, the differential expansion between the bearing housing 110 and the damper fluid 152 can be managed by the accumulation component 156 configured to absorb excess damper fluid 152 caused by a mismatch in the coefficients of thermal expansion. It should be understood that the accumulation component 156 may be rigid or may be flexible/expandable to accommodate excess damper fluid 152. In addition, as shown, the accumulation component 156 may be mounted to the bearing housing 110, i.e. in fluid communication with the first and second fluid damper cavities 124, 126.

Figure 11:
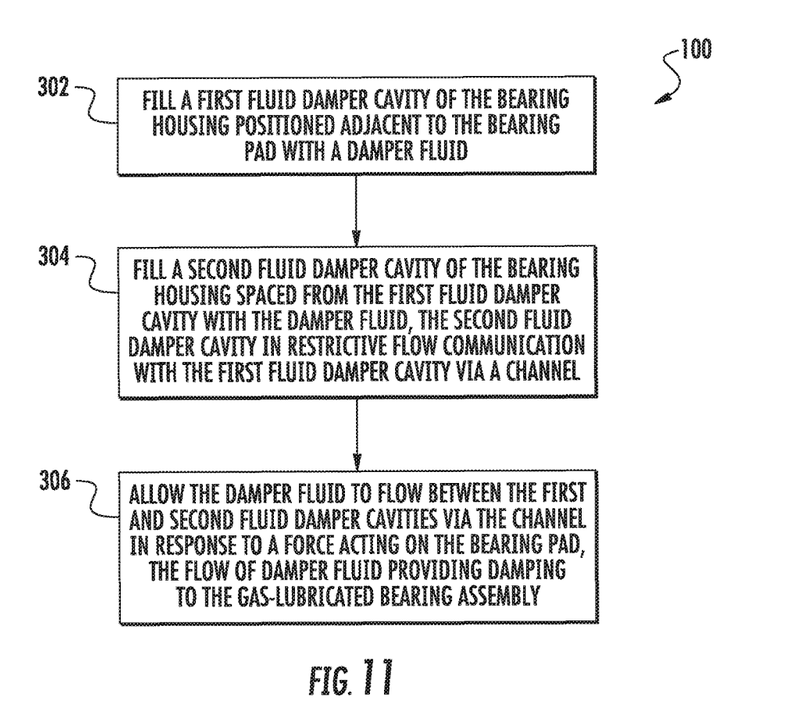
FIG. 11 illustrates a flow diagram of one embodiment of a method for providing damping to a gas-lubricated bearing assembly of a gas turbine engine according to the present disclosure.

Referring now to FIG. 11, the present disclosure is directed to a method 300 for providing damping to a gas-lubricated bearing assembly 100 of a gas turbine engine 10. As shown at 302, the method 300 includes filling a first fluid damper cavity 124 of the bearing housing 110 positioned adjacent to the bearing pad 106 with a damper fluid 152. As shown at 304, the method 300 filling a second fluid damper cavity 126 of the bearing housing 110 spaced from the first fluid damper cavity 124 with the damper fluid 152, the second fluid damper cavity 126 in restrictive flow communication with the first fluid damper cavity 124 via a channel 144. As shown at 306, the method 300 allowing the damper fluid 152 to flow between the first and second fluid damper cavities 124, 126 via the channel 144 in response to a force acting on the bearing pad 106, with the flow of damper fluid 152 providing damping to the gas-lubricated bearing assembly 100.

In one embodiment, the method 300 may further include controlling the damping of the gas-lubricated bearing assembly as a function of at least one of volumetric displacement of the damper fluid 152 per unit linear displacement of the bearing pad, a size of the channel, and a viscosity of the damper fluid 152.

In another embodiment, the step of filling the first and second fluid damper cavities 124, 126 of the bearing housing 110 may include filling the first damper cavity 124 with the damper fluid 152 and allowing the damper fluid 152 to flow from the filled first fluid damper cavity 124 to the second fluid damper cavity 126 via the channel 144.

Figure 12:
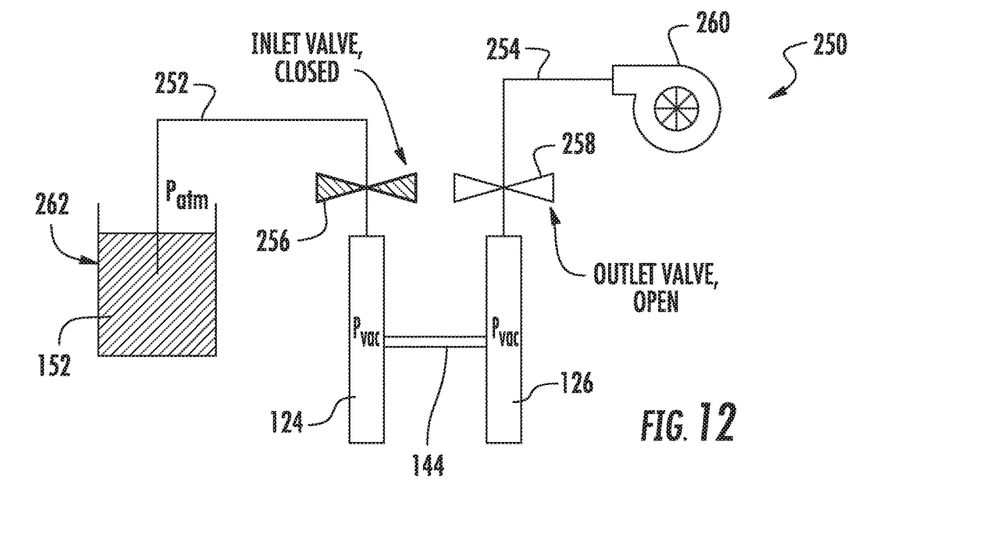
FIG. 12 illustrates a simplified, generic diagram of a single-piece hermetically sealed liquid damped gas bearing assembly according to the present disclosure.
Figure 13:
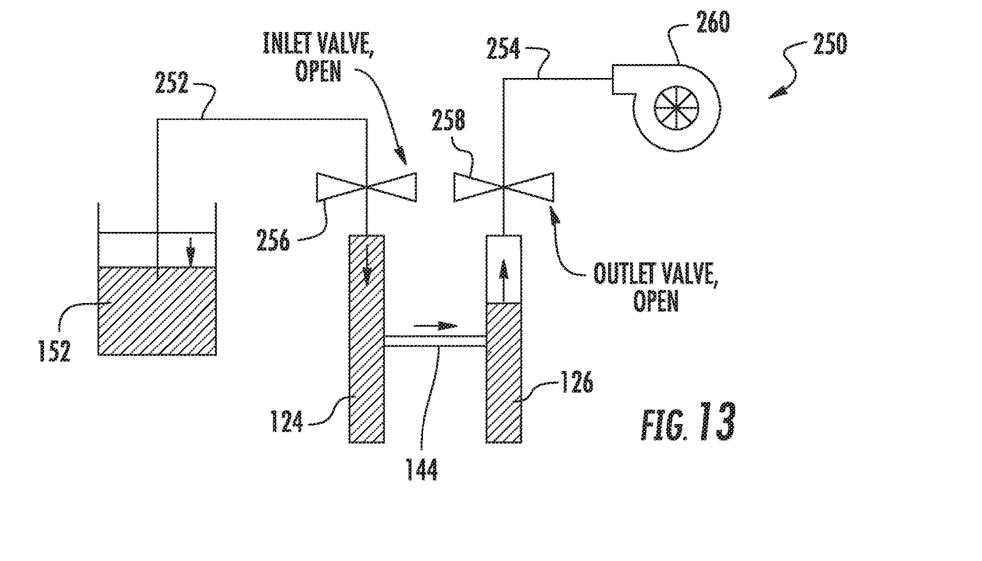
FIG. 13 illustrates a schematic diagram of one embodiment of a fill process of the gas bearing assembly according to the present disclosure.

For example, as shown in FIGS. 12 and 13, the first and second fluid damper cavities 124, 126 may be filled with a damper fluid filling system 250 having inlet tubing 252, outlet tubing 254, one or more valves 256, 258, a vacuum pump 260, and a damper fluid reservoir 262 for filling the first and second damper cavities 124, 126. More specifically, the inlet tubing 252 and an inlet valve 256 may be configured with the damper fluid reservoir and the outlet tubing 254 and an outlet valve 258 may be configured with the vacuum pump 260. Further, the method 300 may include arranging the inlet tubing 252 with the fill hole 158 of the first fluid damper cavity 124 and arranging the outlet tubing 254 with the fill hole 160 of the second fluid damper cavity 126. Thus, as shown in FIG. 12, while the inlet valve 256 remains closed and the outlet valve 258 remains opened, the method 300 may include evacuating, via the vacuum pump 260, air from within the first and second fluid damper cavities 124, 126 so as drop a pressure within the first and second fluid damper cavities 124, 126 near pure vacuum before filling the cavities 124, 126 with the damper fluid 152.

Subsequently, as shown in FIG. 13, once the cavities 124, 126 are evacuated and the pressure is dropped near pure vacuum, both valves 256, 258 may be opened such that the first fluid damper cavity 124 may be filled with the damper fluid 152 via the inlet tubing 252. Moreover, the method 300 includes allowing the damper fluid 152 to flow from the filled first fluid damper cavity 124 to the second fluid damper cavity 126 via the channel 144. Once the first and second fluid damper cavities 124, 126 are filled, the method 300 includes removing the inlet and outlet tubing 252, 254 and capping the fill holes 128, 160 of the first and second fluid damper cavities 124, 126.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A bearing assembly for a gas turbine engine, the bearing assembly comprising:
   a bearing pad for supporting a rotary component; and
   a bearing housing attached to or formed integrally with the bearing pad, the bearing housing comprising:
   a first fluid damper cavity positioned adjacent to the bearing pad;
   a second fluid damper cavity spaced from the first fluid damper cavity and in restrictive flow communication with the first fluid damper cavity via a restrictive channel configured as a clearance gap; and a damper fluid configured within the first and second fluid damper cavities, the bearing housing configured to transfer the damper fluid from the first fluid damper cavity to the second fluid damper cavity via the restrictive channel in response to a force acting on the bearing pad;

wherein each of the first and second fluid damper cavities comprises a fill hole to allow the first and second fluid damper cavities to be filled, respectively.

2. The bearing assembly of claim 1, wherein the first and second fluid damper cavities and the restrictive channel are sealed together and together define a fixed volume.

3. The bearing assembly of claim 1, wherein the damper fluid comprises a fluid comprising a viscosity that decreases with temperature by less than 10% for every 100 degrees Fahrenheit.

4. The bearing assembly of claim 3, wherein the damper fluid comprises a liquid metal.

5. The bearing assembly of claim 4, wherein the liquid metal comprises a gallium-based liquid metal.

6. The bearing assembly of claim 5, wherein the gallium-based liquid metal comprises a gallium indium alloy.

7. The bearing assembly of claim 1, wherein a coefficient of thermal expansion of the damper fluid is approximately equal to a coefficient of thermal expansion of the bearing housing plus or minus about 20%.

8. The bearing assembly of claim 7, further comprising an accumulation component configured to absorb excess damper fluid caused by a mismatch in the coefficient of thermal expansion of the damper fluid and the coefficient of thermal expansion of the bearing housing.

9. The bearing assembly of claim 8, wherein the accumulation component is mounted to the bearing housing.

10. The bearing assembly of claim 1, wherein the bearing assembly defines a radial direction, the first fluid damper cavity being spaced from the second fluid damper cavity along the radial direction.

11. The bearing assembly of claim 1, wherein the bearing housing comprises a first wall comprising a semi-rigid portion and a rigid portion, wherein the semi-rigid portion of the first wall at least partially defines the first fluid damper cavity, and wherein the rigid portion of the first wall at least partially defines the second fluid damper cavity.

12. The bearing assembly of claim 11, wherein the bearing housing further comprises a second wall comprising a semi-rigid portion, wherein the semi-rigid portion of the second wall at least partially defines the second fluid damper cavity.

13. The bearing assembly of claim 1, wherein the bearing housing comprises a semi-rigid column extending towards the bearing pad for providing the bearing pad with an airflow and fully supporting the bearing pad.

14. A method for providing damping to a gas-lubricated bearing assembly of a gas turbine engine, the bearing assembly having a bearing pad for supporting a rotary component and a bearing housing attached to or formed integrally with the bearing pad, the method comprising:
 filling a first fluid damper cavity of the bearing housing positioned adjacent to the bearing pad with a damper fluid;
 filling a second fluid damper cavity of the bearing housing spaced from the first fluid damper cavity with the damper fluid, the second fluid damper cavity in restrictive flow communication with the first fluid damper cavity via a restrictive channel; and
 allowing the damper fluid to flow between the first and second fluid damper cavities via the restrictive channel in response to a force acting on the bearing pad, the flow of damper fluid providing damping to the gas-lubricated bearing assembly;
 wherein each of the first and second fluid damper cavities comprises a fill hole to allow the first and second fluid damper cavities to be filled, respectively.

15. The method of claim 14, further comprising controlling the damping of the gas-lubricated bearing assembly as a function of at least one of volumetric displacement of the damper fluid per unit linear displacement of the bearing pad, a size of the restrictive channel, and a viscosity of the damper fluid.

16. The method of claim 14, wherein filling the first fluid damper cavity of the bearing housing and filling the second fluid damper cavity of the bearing housing further comprises:
 filling the first damper cavity with the damper fluid; and
 allowing the damper fluid to flow from the filled first fluid damper cavity to the second fluid damper cavity via the restrictive channel.

17. The method of claim 16, further comprising:
 providing a damper fluid filling system having inlet tubing, outlet tubing, one or more valves, a vacuum pump, and a damper fluid reservoir for filling the first and second damper cavities;
 arranging the inlet tubing with the fill hole of the first damper cavity;
 arranging the outlet tubing with the fill hole of the second damper cavity;
 filling the first damper cavity with the damper fluid via the inlet tubing;
 allowing the damper fluid to flow from the filled first fluid damper cavity to the second fluid damper cavity via the restrictive channel; and
 once the first and second cavities are filled, removing the inlet and outlet tubing and capping the fill holes of the first and second fluid damper cavities.

18. The method of claim 17, further comprising, before filling the first fluid damper cavity, evacuating, via the vacuum pump, air from within the first and second fluid damper cavities so as drop a pressure within the first and second fluid damper cavities.

19. The method of claim 18, further comprising:
 providing at least one valve in the inlet tubing and at least one valve in the outlet tubing;
 arranging the inlet tubing and the inlet tubing valve with the damper fluid reservoir;
 arranging the outlet tubing and the outlet tubing valve with the vacuum pump;
 closing the inlet tubing valve and opening the outlet tubing valve during evacuating; and
 opening the inlet tubing valve and the outlet tubing valve during filling.

* * * * *